United States Patent [19]

Montino et al.

[11] 4,224,175
[45] Sep. 23, 1980

[54] PROCESS FOR THE PREPARATION OF MAGNETIC POWDERS BASED ON $\gamma$-FE$_2$O$_3$

[75] Inventors: Franco Montino, Casale Monferrato; Ariello R. Corradi, Ospitaletto; Erminio Nonato, Torrion Quartara, all of Italy

[73] Assignee: Montedison S.p.A., Milan, Italy

[21] Appl. No.: 29,937

[22] Filed: Apr. 13, 1979

[30] Foreign Application Priority Data

Apr. 17, 1978 [IT] Italy ............................... 22367 A/78
Mar. 7, 1979 [IT] Italy ............................... 20795 A/79

[51] Int. Cl.$^2$ ............................................. C01G 49/06
[52] U.S. Cl. .................................. 252/62.56; 427/127; 427/215
[58] Field of Search ..................... 252/62.56; 427/127, 427/215

[56] References Cited

U.S. PATENT DOCUMENTS

| | | | |
|---|---|---|---|
| 3,725,126 | 4/1973 | Haller et al. | 252/62.56 X |
| 3,748,270 | 7/1973 | Hwang | 252/62.56 |
| 4,066,564 | 1/1978 | Sasazawa et al. | 252/62.56 |
| 4,069,164 | 1/1978 | Dezawa et al. | 252/62.56 X |
| 4,122,216 | 10/1978 | Okazoe | 252/62.56 X |

FOREIGN PATENT DOCUMENTS 50-37667 4/1975 Japan.

*Primary Examiner*—Jack Cooper
*Attorney, Agent, or Firm*—Stevens, Davis, Miller & Mosher

[57] ABSTRACT

A process is disclosed for obtaining acicular magnetic particles of $\gamma$-Fe$_2$O$_3$ modified with Fe$^{++}$ and Co$^{++}$ ions. The product thus obtained and magnetic tapes containing said product are also disclosed. A suspension of acicular $\gamma$-Fe$_2$O$_3$ in an aqueous solution of soluble Fe$^{++}$ and Co$^{++}$ salts is prepared. NH$_3$ is then added in such quantity that the molar ratio $$NH_3/(Fe^{++} + Co^{++})$$

is between 2.1 and 3, and the whole mass is then heated up to 100°–200° C. When the molar ratio Fe$^{++}$/Co$^{++}$ is greater than about 2.5, it is necessary to operate in the presence of a metered quantity of oxygen or of an oxygen-containing gas; when the ratio is smaller or equal to about 2.5, the presence of a metered quantity of oxygen is optional.

4 Claims, No Drawings

PROCESS FOR THE PREPARATION OF MAGNETIC POWDERS BASED ON γ-FE$_2$O$_3$

The present invention relates to a process for the preparation of powders useful in the field of magnetic recording, consisting or consisting essentially of acicular magnetic particles of γ-Fe$_2$O$_3$ modified with Fe$^{2+}$ and Co$^{2+}$ ions, and having a high intrinsic coerciveness and a high saturation magnetization.

Pure γ-Fe$_2$O$_3$, in an acicular form, is the material most commonly used in the recording and reproduction of sound. However, this material is not fully satisfactory for some specific applications. In fact, although, due to the anisotropy of shape, said material is endowed with an appreciable intrinsic coerciveness (practically around 400 Oersted as maximum value), in some cases where it is desirable to obtain greater reproductive fidelity of the high frequencies, said coercive force must be further increased.

It is already known that for obtaining such a result γ-Fe$_2$O$_3$ may be modified with Co$^{2+}$ ions which induce in the material a magneto-crystalline anisotropy, and that the additioning of the Co$^{2+}$ ions may be made to the γ-Fe$_2$O$_3$ as well as on a precursor thereof (α-FeOOH or Fe$_3$O$_4$).

Another known method for increasing the coerciveness is that of replacing, in the crystalline lattice of γ-Fe$_2$O$_3$, Fe$^{3+}$ ions with Fe$^{2+}$ ions, so as to obtain (FeO)$_x$.Fe$_2$O$_3$ systems in which $0<x<1$. These intermediate states of oxidation of the Fe may be achieved for instance by a controlled incomplete oxidation of precursor Fe$_3$O$_4$, or by reacting γ-Fe$_2$O$_3$ with Fe$^{2+}$ ions in a highly alkaline medium, away from contact with air.

It is likewise known that the two above-mentioned techniques can be combined, thereby achieving (FeO)$_x$.Fe$_2$O$_3$ systems modified with Co$^{2+}$ ions. These compounds may be obtained, for instance, by means of a hydrothermal treatment in the absence of air, of acicular γ-Fe$_2$O$_3$, with solutions containing Fe$^{2+}$ and Co$^{2+}$ ions, in a highly alkaline medium, the alkali being NaOH.

Alternatively, these compounds may be prepared by coprecipitation of α-FeOOH with Co(OH)$_2$, followed by a reduction to Fe$_3$O$_4$ and an incomplete, controlled oxidation to γ-Fe$_2$O$_3$, or alternatively, by depositing on the surface of γ-Fe$_2$O$_3$ a layer of Fe$_3$O$_4$ (by oxidation of Fe(OH)$_2$ with air) and successively a layer of CoFe$_2$O$_4$ (by oxidation of Fe(OH)$_2$ in the presence of Co(OH)$_2$ in a molar ratio of 2:1).

The above-cited processes are considerably complex. They require rather long reaction times and heavy excesses of reactants and heat treatments (for instance of oxidation) that are not easily controllable. Moreover, the presence of Fe$^{2+}$ and/or Co$^{2+}$ ions in the crystalline lattice of γ-Fe$_2$O$_3$, while it produces a considerable increase in magneto-crystalline anisotropy, makes the material more sensitive to the effects of temperature and pressure.

In fact, the anisotropy and magnetostriction constant of γ-Fe$_2$O$_3$ containing Fe$^{2+}$ and Co$^{2+}$ depends to a large extent on the temperature. Thus, for instance, the best tapes prepared with materials obtained according to the above specified methods, show a $\Delta M_R$ (decrease of the value of residual magnetization $M_R$) that is greater than 10% (when they have been treated for ½ hour at 150° C. in air with 90% of moisture) and greater than 12% (when, before this treatment, they have also been calendered). Practically, therefore, this type of material is extremely sensitive to the effects of aging and calendaring.

Thus, one object of this invention is that of providing a process that will not require particular heat treatments and that will allow one to obtain, starting from acicular γ-Fe$_2$O$_3$, a powder consisting of γ-Fe$_2$O$_3$ modified with Fe$^{2+}$ and Co$^{2+}$, with rather short reaction times and with a limited consumption of reactants and without prejudicing the initial morphological homogeneity of the starting γ-Fe$_2$O$_3$.

Still another object of the invention is that of providing a powder consisting or consisting essentially of γ-Fe$_2$O$_3$ modified with Fe$^{2+}$ and Co$^{2+}$ ions, endowed with a high intrinsic coercitivity and a high saturation magnetization, well suited for conferring upon the magnetic tapes a high fidelity of reproduction of the high frequencies, as well as an excellent stability with respect to temperature and time; that is, having a reduced decrement of the residual magnetization ($M_R$).

It has now been found in accordance with the present invention that, by reacting acicular γ-Fe$_2$O$_3$ with Fe$^{2+}$ and Co$^{2+}$ ions, the nature and the excess of the alkali used and the presence, for given values of the molar ratio Fe$^{++}$/Co$^{++}$, of a definite quantity of oxygen in the reaction medium, are critical factors for attaining the desirable ends mentioned above.

More particularly, it has been found that it is possible by hydrothermal means to transform γ-Fe$_2$O$_3$ into a product modified with Fe$^{2+}$ and Co$^{2+}$ that will be endowed with excellent magnetic properties, without using high concentrations of alkalies, if the alkali used for neutralizing the Fe$^{2+}$ and Co$^{2+}$ ions provided for modifying the starting oxide is ammonia.

More particularly, it has been found that the molar ratio of $$NH_3/(Fe^{++} + Co^{++})$$

must be between 2.1 and 3, and that the best products are in general obtained when said ratio is between 2.1 and 2.3, that is, when using amounts of ammonia only a little above the stoichiometric value (2.0) corresponding to neutralization.

When the molar ratio Fe$^{++}$/Co$^{++}$ of the solution is greater than about 2.5, it has on the other hand been found that, if the hydrothermal treatment is conducted in the absence of air, the product, when examined under the electron microscope, proves morphologically heterogeneous and, thus, not suited for the purposes of the invention. Vice versa, it has been found that in order to preserve the original morphology of the starting oxide, there must initially be present in the reaction medium (that is, in the free volume of the autoclave in which is carried out the hydrothermal treatment) a certain quantity of oxygen or of an oxygen-containing gas, preferably air.

More particularly, when the Fe$^{++}$/Co$^{++}$ molar ratio is greater than about 2.5, a quantity of oxygen (or of an oxygen-containing gas) must be used that shall not exceed 28% of the stoichiometric quantity required for oxidizing all of the ferrous iron in the solution to the ferric state. Preferably the quantity of oxygen will be between 10% and 28% of the stoichiometric quantity necessary for oxidizing to Fe$^{3+}$ all the Fe$^{2+}$ introduced as a modifier.

Thus the principal object of this invention is attained by providing a process for the preparation of acicular magnetic particles consisting or consisting essentially of $\gamma$-$Fe_2O_3$ modified with $Fe^{2+}$ and $Co^{2+}$ ions, by treating hydrothermally, in the presence of alkalies, a suspension of acicular $\gamma$-$Fe_2O_3$ in an aqueous solution of soluble salts of $Fe^{2+}$ and $Co^{2+}$, said process being characterized in that as alkali there is used $NH_3$ in such a quantity that the molar ratio $$NH_3/(Fe^{++} + Co^{++})$$

is between 2.1 and 3; that the treatment is conducted at temperatures between 100° and 200° C.; and that when the molar ratio $$Fe^{++}/Co^{++}$$

is greater than about 2.5, one shall operate in the presence of oxygen or an oxygen-containing gas, the quantity of oxygen not being greater than 28% of the stoichiometric value required for oxidizing all of the ferrous iron to the ferric state; while, when said ratio is lower or equal to about 2.5, one operates either in the absence or presence of oxygen or of an oxygen-containing gas, the quantity of oxygen then being between 0% and 28% with respect to the stoichiometric value mentioned above.

The results of tests carried out with a $Fe^{++}/Co^{++}$ molar ratio equal to 3.5 are recorded below in Table I. Some of the tests were conducted with $NH_3$ (Examples Nos. 1, 2, 3, 7, 8 and 9) while other tests were conducted with NaOH (Examples Nos. 4, 5, 6, 10 and 11). The molar ratio alkali/$Fe^{2+}$+$Co^{2+}$ varies from 2 to 3.

Some of the tests (Examples Nos. 1, 3, 4, 5, 7, 8 and 10) were conducted in the presence of air (16.5% of the quantity theoretically necessary for oxidizing all of the $Fe^{2+}$ to $Fe^{3+}$); still other tests (Examples Nos. 2, 6, 9 and 11) were conducted in the complete absence of air.

Table I illustrates what has surprisingly been found, that is, that when using $NH_3$ one achieves lower reaction times and higher values of $H_{ci}$ and $\sigma_s$, and that when using $NH_3$:

(a) the optimum quantity varies from 2.1 to 2.3 mols/mol of $Fe^{2+}$+$Co^{2+}$ (that is, the quantity required is only slightly greater than that necessary for neutralizing the $Fe^{2+}$ and $Co^{2+}$ ions); and (b) it is necessary to operate in the presence of oxygen in order to safeguard the morphological homogeneity of the product, when the ratio $Fe^{++}/Co^{++}$ is greater than about 2.5.

In the following will now be given further preferred forms of this invention.

Into an aqueous solution of an $Fe^{2+}$ salt and a $Co^{2+}$ salt (preferably sulphate, nitrate, chloride or acetate) is suspended a $\gamma$-$Fe_2O_3$ powder of acicular morphology, having particles of suitable sizes, for instance a length=0.2 to 1.0 $\mu$m and a ratio length/diameter=5 to 15. In the solution, the total concentration of $Fe^{++}$ and $Co^{++}$ is preferably between 1 and 46 g/l. In the suspension, the concentration of $\gamma$-$Fe_2O_3$ is preferably between 50 and 100 g/lt.

The quantity of $Co^{2+}$ introduced into the solution in general is between 1% and 5% by weight, calculated on the final product, and preferably between 2% and 4% by weight.

The molar ratio $Fe^{++}/Co^{++}$ in general is between 1 and 5. The preferred products are often obtained with a ratio between 2 and 3.

In order to obtain the desired weight percentage of Co in the end product, the quantity of $Co^{++}$ to be introduced into the reaction medium is calculated by taking into consideration the weight of $\gamma$-$Fe_2O_3$ to be modified, the molar ratio $Fe^{++}/Co^{++}$ of the $Fe^{++}$ and $Co^{++}$ salts introduced into the reaction, and the possible degree of oxidation from $Fe^{++}$ to $Fe^{+++}$ when one operates in the presence of oxygen.

The suspension of $\gamma$-$Fe_2O_3$ in the solution of $Fe^{2+}$ and $Co^{2+}$ salts is poured into an autoclave fitted with a suitable stirring system, capable of maintaining the solid particles constantly suspended and to insure a sufficient exchange between the suspension and the possibly introduced air.

Since at an alkaline pH the $Fe^{2+}$ easily becomes oxidizable, it is advisable that the addition of the aqueous $NH_3$ solution, necessary for neutralizing the $Fe^{++}$ and $Co^{++}$ ions, be carried out in the absence of air in order to avoid an uncontrolled oxidation. If necessary, the desired quantity of air will be fed into the reactor after the addition of the alkali.

Thus, for instance, it is possible to eliminate the air present in the autoclave by connecting the autoclave with a vacuum pump and subsequently, after having interrupted the connection with the pump, to suck up the $NH_3$ solution through a siphon inside the autoclave itself.

The quantity of $NH_3$, added as a 5 to 10 molar solution, is between 2.1 and 3 mols/mol of $Fe^{2+}$+$Co^{2+}$, but preferably between 2.1 and 2.3 mols/mol of $Fe^{2+}$+$Co^{2+}$.

The addition of the $NH_3$ solution is carried out in a gradual and uniform way, while keeping the suspension under proper stirring.

At this point, into the autoclave, still under a certain degree of vacuum, when it is necessary, there is introduced a controlled quantity of air.

As already explained, when the molar ratio $Fe^{++}/Co^{++}$ is greater than about 2.5, a quantity of oxygen or an oxygen-containing gas is used that is not greater than 28% of the stoichiometric quantity required for oxidizing the ferrous iron to the ferric state. Preferably, the quantity of oxygen is between 10% and 28% of the stoichiometric quantity. These values correspond to a quantity of air equal to 5 to 14 Nl/100 g of $Fe^{++}$. When the molar ratio $Fe^{++}/Co^{++}$ is less than or equal to about 2.5, one may operate as previously explained, either in the absence of oxygen or in the presence of a metered quantity of oxygen (or of an oxygen-containing gas); said quantity in general is between 0% and 28% with respect to the stoichiometric quantity necessary for the complete oxidation of the ferrous iron to the ferric state.

When oxygen is used, it is advisable to limit its quantity, provided it be sufficient to maintain homogeneous the morphology of the starting $\gamma$-$Fe_2O_3$, inasmuch as it has been found that increasing quantities of oxygen usually cause a lowering of the $H_{ci}$ value. In fact, the maximum $H_{ci}$ values are constantly to be found to correspond to lesser quantities of introduced air.

Thus, it is convenient to limit the quantity of air to be introduced to the minimum necessary for the desired modification with $Fe^{++}$ and $Co^{++}$ to take place without compromising the morphology of the starting magnetic oxide.

After the possible feeding in of air, the suspension is brought up to the pre-established temperature, within the range of 100° to 200° C., but preferably in the range of from 140° to 180° C., keeping the pre-established temperature at that level for the time necessary for completing the reaction. This reaction time is between 180 and 300 minutes when operating at 100° C., and from 20 to 60 minutes when operating at 160° C.

The product thus obtained is then filtered, washed and dried under vacuum at a temperature of for instance 100° to 120° C.

The final product consists of $\gamma$-Fe$_2$O$_3$ modified with Fe$^{2+}$ and Co$^{2+}$. It preserves all the morphological characteristics of the starting magnetic oxide. It displays very high values of intrinsic coerciveness (H$_{ci}$) and magnetization saturation ($\sigma_s$) and is, thus, particularly suited for being used as magnetic recording material.

Operating according to the conditions that characterize this invention, it is possible to control within wide limits the values of the intrinsic coerciveness of the product by varying the molar ratio Fe$^{2+}$/Co$^{2+}$, the reaction temperature, and the percentage of introduced Co. More particularly, higher values of coerciveness may be obtained by:

increasing the molar ratio Fe$^{2+}$/Co$^{2+}$ (see Examples 12 to 17 and Table II);

increasing the reaction temperature (see Examples 18 to 20 and Table III);

increasing the percentage of cobalt in the end product (see Examples 21 to 22 and Table IV).

A further control of the coerciveness is possible by varying, all other conditions remaining the same, the quantity of air. More particularly, higher values of coerciveness are obtained by reducing the quantity of air introduced into the autoclave (see Examples 12 to 17 and Table II), although care must be taken not to let the quantity of air drop too low when the molar ratio Fe$^{2+}$/Co$^{2+}$ is greater than about 2.5 because, otherwise, the product obtained would show a heterogeneous morphology.

Summing up, the $\gamma$-Fe$_2$O$_3$ modified with Fe$^{2+}$ and Co$^{2+}$, as obtained by the process of this invention, shows characteristics that depend on the characteristics of the starting $\gamma$-Fe$_2$O$_3$ and which may be widely controlled by acting on the described operational variants.

Practically, with the process which is the object of this invention it is possible to obtain $\gamma$-Fe$_2$O$_3$ modified with Fe$^{2+}$ and Co$^{2+}$ having the following characteristics:

Content in Fe$^{2+}$ = 0.8 to 21%
Content in Co$^{2+}$ = 1 to 5%
Length of acicular particles: L$\simeq$0.2 to 1 $\mu$m
Length/diameter ratio = L/D = 5 to 15
Intrinsic coerciveness: H$_{ci}$ = 440 to 800 Oersted
Magnetization saturation at room temperature per unit mass: $\sigma_s$ = 74 to 83 emu/g.

The products of this invention are also characterized by an excellent stability with respect to temperature and time. In fact, the magnetic tapes prepared with them show $\Delta M_R$ values (decrement of the value of residual magnetization) lower than 5% (for the non-calendered tapes) and lower than 6% (for calendered tapes), after a 30 minutes treatment at 150° C. and 90% moisture. Another fundamental characteristic of these products is that of conferring upon the magnetic tapes prepared from them a high reproduction fidelity at the high frequencies. In fact, their saturation output is far superior to that of chromium dioxide; the improvement may reach, for instance, a value of 5.5 dB, as illustrated below in Example 29.

The following examples are given in order still better to illustrate the advantages and characteristics of this invention without however limiting its scope.

EXAMPLE 1

Into a 2-liter autoclave, fitted with an anchor stirrer revolving at 400 r.p.m., a loading gate, a feeding siphon with a valve, a loading and discharging valve for gas, and a suitable heating system, were charged 75 g of acicular $\gamma$-Fe$_2$O$_3$ (L=0.4 $\mu$m, L/D$\simeq$5, H$_{ci}$=340 Oersted, $\sigma_s$=75 emu/g) and 0.8 liters of solution containing 205 millimols of FeSO$_4$ and 58.5 millimols of CoSO$_4$ (the molar ratio Fe$^{2+}$/Co$^{2+}$ is equal to 3.5).

Thereupon the stirrer was started and the air contained in the autoclave was removed by connecting this latter for a sufficient time with a vacuum pump. Then in about 5 minutes, through the siphon into the autoclave were introduced 110 cc of an aqueous solution of NH$_3$ 5.27 molar (the molar ratio alkali/Fe$^{2+}$ +Co$^{2+}$ equals 2.2).

Once the addition of NH$_3$ was completed, through the siphon 50 cc of H$_2$O were introduced, so that the volume of the suspension corresponded to 1 liter (the concentration of $\gamma$-Fe$_2$O$_3$ in the suspension equals 75 g/lt.)

The free volume (about 1 lt.) was filled with air under atmospheric pressure. The quantity of air now present in the reactor amounted to 7.9 Nlt/100 g of Fe$^{2+}$, that is, corresponding to 16.5% of that theoretically necessary for oxidizing all the Fe$^{2+}$ to Fe$^{3+}$.

The temperature of the suspension was then brought in 1 hour up to 160° C. and maintained at that level for 30 minutes. The suspension was then allowed to cool down to room temperature and the powder was then filtered, washed and dried at 110° C. under vacuum.

When examined under the electron microscope, the powder appeared morphologically homogeneous because it maintained the morphology and the dimensions of the starting $\gamma$-Fe$_2$O$_3$.

The powder contained 3.57% of Co and had an intrinsic coerciveness (H$_{ci}$) of 745 Oersted and a magnetic saturation momentum ($\sigma_s$) of 81.5 emu/g.

The results of this test are recorded below in Table I.

In that table (and in the following ones), the letters O and E, respectively, indicate products that are morphologically homogeneous (that is products that have preserved the morphological characteristics of the starting $\gamma$-Fe$_2$O$_3$) or are heterogeneous.

EXAMPLE 2

Example 1 was repeated following the same procedures, but operating in the absence of air; that is, after the loading of the reactants into the reactor, this latter was maintained under vacuum.

The results thus obtained are recorded in Table I.

EXAMPLES 3 TO 11

The same procedures were followed as those indicated above in Example 1, except for the following:

in some of the examples NaOH is used as an alkali instead of NH$_3$;

variable alkali/(Fe$^{++}$+Co$^{++}$) molar ratios are used;

in some of the examples air (16.5% with respect to the stoichiometric quantity necessary for the complete oxidation of $Fe^{++}$) is used; in other examples the operation is carried out in the absence of air.

The results thus obtained are recorded in Table I.

EXAMPLES 12 TO 14

Example 1 was repeated following the same procedures, except for varying the $Fe^{2+}/Co^{2+}$ molar ratio and the quantity of air introduced into the autoclave.

More particularly, the tests were carried out with an $Fe^{2+}/Co^{2+}$ molar ratio varying from 1 to 5 with a quantity of air equal to 14% of the theoretical quantity required for the oxidation of $Fe^{2+}$ to $Fe^{2+}$ (that is, with 6.7 Nlt/100 g of $Fe^{2+}$).

The results are recorded in Table II.

EXAMPLES 15 TO 17

Examples 12 to 14 were repeated with the same procedures, varying, however, the quantity of air introduced into the autoclave from 14% to 28% of the theoretical quantity necessary for oxidizing $Fe^{2+}$ to $Fe^{3+}$ (i.e., with 13.4 Nlt/100 g of $Fe^{2+}$).

The results are recorded in Table II.

EXAMPLES 18 TO 20

Example 1 was repeated according to the same procedures, but varying the reaction temperature (from 160° C. to 100° C.) and the reaction time.

The results are recorded in Table III.

EXAMPLES 21 AND 22

Example 1 was repeated following the same procedures, except for varying the percentage of Co in the end product.

The results are recorded in Table IV.

EXAMPLES 23 TO 27

In the following examples there was used an $Fe^{2+}/Co^{2+}$ molar ratio between 2 and 3, operating either in the absence or in the presence of air. They show that it is possible to operate in the absence of oxygen, provided that the $Fe^{++}/Co^{++}$ molar ratio is not greater than about 2.5.

In Examples 23, 24 and 25, the operation was in the absence of air with an $Fe^{++}/Co^{++}$ molar ratio, respectively, equal to 2, 2.5 and 3.

In Examples 26 and 27, where the $Fe^{++}/Co^{++}$ ratio is equal respectively to 2.5 and 3, the operation was in the presence of 17.5% of air with respect to the stoichiometric quantity necessary for the complete oxidation of the ferrous iron to ferric iron.

The starting $\gamma$-$Fe_2O_3$ showed the following characteristics: L=0.6 $\mu$m; L/D=5.5; $H_{ci}$=315 Oersted; $\sigma_s$=75 emu/g.

Example 23 was carried out in a 22-liter autoclave equipped like the 2-liter autoclave of Example 1. In this autoclave were charged 1,164 g of $\gamma$-$Fe_2O_3$ and 13 liters of a solution containing 1.29 mols of $FeSO_4$ and 0.645 mols of $CoSO_4$. Following the same procedures as those described above in Example 1, to the thus-obtained suspension were added 810 cc of an aqueous solution of $NH_3$ (5.24 molar) and then water to bring the total volume of the suspension up to 15.3 liters. The autoclave was then left under a vacuum and the suspension was heated up to 160° C., proceeding as in Example 1.

The powder thus obtained, when examined under the electron microscope, showed that it maintained the morphology of the starting $\gamma$-$Fe_2O_3$ and contained 2.86% of Co, 5.5% of $Fe^{++}$ and 66.8% of total Fe. Its magnetic properties are recorded in Table V.

The Example 24 operation was the same as in Example 23, except that the $Fe^{++}/Co^{++}$ molar ratio was adjusted to 2.5. A powder was obtained that maintained the morphology of the starting magnetic oxide and contained 2.78% of Co, 6.6% of $Fe^{++}$ and 67.1% total Fe. Its magnetic properties are recorded in Table V.

The Example 25 operation was the same as in Example 23, except that the $Fe^{++}/Co^{++}$ ratio was adjusted to 3. The powder thus obtained appeared to be morphologically heterogeneous. Its magnetic properties are recorded in Table V.

The Example 26 operation was the same as in Example 24, and thus with a $Fe^{++}/Co^{++}$ ratio equal to 2.5, but in this case air was introduced into the autoclave to the extent of 17.5% of the stoichiometric amount corresponding to the complete oxidation of $Fe^{++}$ to $Fe^{+++}$. The powder thus obtained retained the morphology of the starting $\gamma$-$Fe_2O_3$, and contained 2.85% of Co, 5.9% of $Fe^{2+}$, and 66.9% total Fe. Its magnetic properties are recorded in Table V.

The Example 27 operation was the same as in Example 25, and thus with a $Fe^{++}/Co^{++}$ ratio equal to 3, but air was introduced into the autoclave in a quantity equal to 17.5% of the stoichiometric amount corresponding to the complete oxidation of $Fe^{++}$ to $Fe^{+++}$. The powder obtained retained the morphology of the starting magnetic oxide, and showed a content in Co of 2.77%, in $Fe^{2+}$ of 6.3%, and in total Fe of 66.9%. Its magnetic properties are recorded in Table V.

EXAMPLE 28

Using the powder obtained in Example 1, a magnetic tape was prepared with an initial thickness of 20 $\mu$m and with a magnetic layer of 8 $\mu$m.

On a part of the tape was measured the value of the residual magnetization ($M_R$). Thereafter the tape was placed in an oven with circulation of air, and containing water. The temperature was brought up to 150° C. and after ½ hour the $M_R$ value was again measured and the variation of $M_R$ was found to be equal to 4.5%.

The remainder of the tape was calendered to a total thickness of 16.5 $\mu$m and then cut. On a 3.81 mm width of this tape the static magnetic characteristics and the electro-acoustical characteristics were then verified with reference to a $CrO_2$ (C 401 R) sample tape.

These characteristics are listed below with the numbers in parentheses indicating the corresponding characteristics of the reference tape:

| | | |
|---|---|---|
| $H_{ci}$ (Oersted) | 730 | (490) |
| $B_r/B_s$ | 0.80 | (0.84) |
| $M_R$ (%) non-calendered tape | 4.5 | |
| $M_R$ (%) calendered tape | 5.5 | |
| Print Through (dB) | 52 | (53) |
| MOL 333 Hz (dB) | ±0 | (±0) |
| Saturation Output (dB) | +3.5 | (±0) |
| Bias Noise (dB) | ±0 | (±0) |

The "Print Through" value represents the magnetization of one tape layer by the signals impressed on the adjacent layers. The value of the Print Through is thus obtained as a ratio between the value of the signal recorded on one tape layer and the value of the echo-signal recorded by contact on the adjacent tape layer.

The MOL (maximum output level) of 333 Hz represents the maximum output level obtained with a simple signal equal to 250 nWb/m and with a frequency of 333 Hz, which produced a distortion of third harmonic equal to 3% (the MOL value is given with reference to the sample tape).

The Saturation Output represents the output level obtained from the recording of a 10 KHz signal producing saturation of the tape.

The Bias Noise is the background noise of the tape on which there has been recorded only the bias signal (that is, the signal due to the polarization current).

EXAMPLE 29

Following the same procedures as those of Example 28, a magnetic tape was prepared using the powder of Example 26. The loss of residual magnetization $M_R$ on the non-calendered tape, measured as in Example 28, amounted to 3.5%.

On the calendered tape the static magnetic characteristics and the electro-acoustical properties were then taken as in Example 28. The results thus obtained are listed below:

| | | |
|---|---|---|
| $H_{ci}$ (Oersted) | 650 | (490) |
| $B_r/B_s$ | 0.80 | (0.84) |
| $\Delta M_R$ (%) calendered tape | 3.5% | |
| Print Through (dB) | 50.5 | (53) |
| MOL 333 Hz (dB) | +0.5 | (±0) |
| Saturation Output (dB) | +5.5 | (±0) |
| Bias Noise (dB) | −1.5 | (±0) |

TABLE I

Magnetic and morphological characteristics of the products modfied with $Co^{2+}$ and $Fe^{2+}$ depending on the nature and quantity of alkali, and on the presence or absence of air.

| Example | Molar Ratio $Fe^{++}/Co^{++}$ | Mols Alkali mols $(Fe^{2+} + Co^{2+})$ | Alkali | Air (%) | Reaction Time (minutes) | $H_{ci}$ (Oersteds) | $\sigma_s$ (emu/g) | Morphology O = Homogeneous E = Heterogeneous |
|---|---|---|---|---|---|---|---|---|
| 1 | 3.5 | 2.2 | $NH_3$ | 16.5 | 30 | 745 | 81.50 | O |
| 2 | " | 2.2 | $Nh_3$ | — | 30 | 825 | 73.50 | E |
| 3 | " | 2 | $NH_3$ | 16.5 | 30 | 1130 | 52.90 | E |
| 4 | " | 2 | NaOH | 16.5 | 30 | 1030 | 50.55 | E |
| 5 | " | 2.2 | NaOH | 16.5 | 60 | 470 | 80.75 | O |
| 6 | " | 2.2 | NaOH | — | 60 | 490 | 79.60 | O |
| 7 | " | 2.5 | $NH_3$ | 16.5 | 30 | 640 | 81.40 | O |
| 8 | " | 3 | $NH_3$ | 16.5 | 30 | 650 | 81.15 | O |
| 9 | " | 3 | $NH_3$ | — | 30 | 735 | 78.20 | E |
| 10 | " | 3 | NaOH | 16.5 | 240 | 575 | 78.50 | O |
| 11 | " | 3 | NaOH | — | 210 | 605 | 74.80 | O |

TABLE II

Magnetic and morphological characteristics of the products modified with $Co^{2+}$ and $Fe^{2+}$ depending on the quantity of air and on the molar ratio $Fe^{2+}/Co^{2+}$.

| Example | mols $Fe^{2+}$ mols $Co^{2+}$ | Air (%) | $H_{ci}$ (Oersteds) | $\sigma_s$ (emu/g) | Morphology O = Homogeneuos |
|---|---|---|---|---|---|
| 12 | 1 | 14 | 510 | 76.80 | O |
| 13 | 2 | 14 | 718 | 79.90 | O |
| 14 | 5 | 14 | 765 | 81.20 | O |
| 15 | 1 | 28 | 450 | 73.80 | O |
| 16 | 2 | 28 | 600 | 78.50 | O |
| 17 | 5 | 28 | 695 | 80.55 | O |

TABLE III

Magnetic and morphological characteristics of the products modified with $Co^{2+}$ and $Fe^{2+}$ depending on the reaction temperature.

| Example | Reaction Temperature (%) | Reaction Time (minutes) | $H_{ci}$ (Oersteds) | $\sigma_s$ (emu/g) | Morphology O = Homogeneous |
|---|---|---|---|---|---|
| 1 | 160 | 30 | 745 | 81.50 | O |
| 18 | 130 | 30 | 550 | 82.50 | O |
| 19 | 130 | 300 | 600 | 80.85 | O |
| 20 | 100 | 300 | 510 | 82.65 | O |

TABLE IV

Magnetic and morphological characteristics of the products modified with $Co^{2+}$ and $Fe^{2+}$ depending on the percentage of Co.

| Example | % of Co in the End Product | $H_{ci}$ (Oersteds) | $\sigma_s$ (emu/g) | Morphology O = Homogeneous |
|---|---|---|---|---|
| 1 | 3.6 | 745 | 81.50 | O |
| 21 | 2.6 | 635 | 78.80 | O |
| 22 | 1.4 | 440 | 77.40 | O |

TABLE V

Magnetic and morphological characteristics of the products modified with $Co^{++}$ and $Fe^{++}$ obtained in either the presence or absence of air at different $Fe^{++}/Co^{++}$ ratios.

| Example | Molar Ratio $Fe^{2+}/Co^{2+}$ | Air | $H_{ci}$ (Oersteds) | $\sigma_s$ (emu/g) | Morphology O = Homogeneous E = Heterogeneous |
|---|---|---|---|---|---|
| 23 | 2 | None | 625 | 79.6 | O |
| 24 | 2.5 | None | 700 | 78.0 | O |
| 25 | 3 | None | 850 | 62.0 | E |
| 26 | 2.5 | 17.5% | 635 | 79.2 | O |
| 27 | 3 | 17.5% | 710 | 75.5 | O |

What is claimed is:

1. A process for preparing acicular magnetic particles consisting essentially of $\gamma\text{-}Fe_2O_3$ modified with $Fe^{2+}$ and $Co^{2+}$ ions, by treating hydrothermally, and in the presence of an alkali, a suspension of acicular $\gamma\text{-}Fe_2O_3$ in an aqueous solution of soluble $Fe^{2+}$ and $Co^{2+}$ salts, characterized in that as an alkali there is used $NH_3$ in such a quantity that the molar ratio $$NH_3/(Fe^{++}+Co^{++})$$

is between 2.1 and 2.3; that the molar ratio $Fe^{++}/Co^{++}$ in said solution is between 2 and 3; that the treatment is conducted at a temperature between 140° C. and 180° C.; and that when the molar ratio $Fe^{++}/Co^{++}$ is greater than about 2.5 the process is conducted in the presence of oxygen or of an oxygen-containing gas, the quantity of oxygen not exceeding 28% of the stoichiometric amount required for oxidizing all the ferrous iron to the ferric state, while, when the ratio $Fe^{++}/Co^{++}$ is less than or equal to about 2.5, the process is conducted either in the absence or in the presence of oxygen or of an oxygen-containing gas, the quantity of oxygen in that event being between 0% and 28% with respect to the above-defined stoichiometric amount.

2. A process according to claim 1, characterized in that when the molar ratio $Fe^{++}/Co^{++}$ is greater than 2.5 the quantity of oxygen present in the reaction is equal to 10% to 28% of the stoichiometric value required for oxidizing all the ferrous iron to the ferric state.

3. A process according to claim 1, characterized in that the soluble salts of $Fe^{2+}$ and $Co^{2+}$ are selected from the group consisting of sulphate, nitrate, chloride and acetate.

4. A process according to claim 1, characterized in that the concentration of $\gamma\text{-}Fe_2O_3$ in the suspension is between 50 and 100 g/liter.

* * * * *